United States Patent
Brooks et al.

(10) Patent No.: US 10,180,819 B2
(45) Date of Patent: *Jan. 15, 2019

(54) PROCESSING FIXED AND VARIABLE LENGTH NUMBERS

(71) Applicant: Oracle International Corporation, Redwood City, CA (US)

(72) Inventors: Jeffrey S. Brooks, Austin, TX (US); Christopher H. Olson, Austin, TX (US); Eugene Karichkin, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 65 days.

This patent is subject to a terminal disclaimer.

(21) Appl. No.: 15/334,349

(22) Filed: Oct. 26, 2016

(65) Prior Publication Data

US 2017/0046128 A1    Feb. 16, 2017

Related U.S. Application Data

(63) Continuation of application No. 14/251,791, filed on Apr. 14, 2014, now Pat. No. 9,507,564.

(51) Int. Cl.
*G06F 7/483* (2006.01)
*G06F 7/499* (2006.01)
*G06F 7/52* (2006.01)

(52) U.S. Cl.
CPC .......... *G06F 7/483* (2013.01); *G06F 7/49947* (2013.01); *G06F 7/52* (2013.01); *G06F 2207/3816* (2013.01)

(58) Field of Classification Search
None
See application file for complete search history.

(56) References Cited

U.S. PATENT DOCUMENTS

| | | | | |
|---|---|---|---|---|
| 4,617,641 A | * | 10/1986 | Hamada | G06F 7/48 341/95 |
| 4,758,973 A | * | 7/1988 | Ooyama | H03M 7/24 341/50 |
| 4,758,975 A | * | 7/1988 | Omoda | G06F 5/012 341/67 |
| 4,760,551 A | * | 7/1988 | Yokomizo | G06F 7/48 341/50 |
| 4,872,132 A | * | 10/1989 | Retter | G06F 5/01 708/404 |
| 5,870,741 A | * | 2/1999 | Kawabe | G06F 17/30017 |
| 7,188,133 B2 | | 3/2007 | Miyasaka et al. | |
| 7,840,622 B2 | | 11/2010 | Gerwig et al. | |
| 8,051,118 B2 | | 11/2011 | Lundvall et al. | |

(Continued)

*Primary Examiner* — David H Malzahn
(74) *Attorney, Agent, or Firm* — Meyertons, Hood, Kivlin, Kowert & Goetzel, P.C.

(57) ABSTRACT

Embodiments of a processor are disclosed for performing arithmetic operations on variable-length and fixed-length machine independent numbers. The processor may include a floating point unit, and a logic circuit. The number unit may be configured to receive an operation, and first and second operands. Each of the first and second operands may include a sign byte, and multiple mantissa bytes, and may be processed in response to a determination that the operands are fixed-length numbers. The logic circuit may be further configured to perform the received operation on the processed first and second operands.

20 Claims, 9 Drawing Sheets

(56) References Cited

U.S. PATENT DOCUMENTS

| | | |
|---|---|---|
| 8,065,669 B2 | 11/2011 | Donovan et al. |
| 8,706,790 B1 | 4/2014 | Langhammer |
| 8,719,322 B2 | 5/2014 | Bishop |
| 2015/0293747 A1* | 10/2015 | Brooks .................. G06F 7/483 |
| | | 708/495 |
| 2017/0322768 A1* | 11/2017 | Brooks .................. G06F 7/483 |

* cited by examiner

PROCESSING FIXED AND VARIABLE LENGTH NUMBERS

PRIORITY INFORMATION

This application is a continuation of patent application Ser. No. 14/251,791, entitled "Processing Fixed and Variable Length Numbers," filed Apr. 14, 2014, which is hereby incorporated by reference in its entirety as though fully and completely set forth.

BACKGROUND

Technical Field

The embodiments disclosed herein relate to integrated circuits, and more particularly, to processors and floating point number units.

Description of the Related Art

Processors are used in in a variety of applications ranging from desktop computers to cellular telephones. In some applications, multiple processors or processor cores, may be connected together so that computation tasks may be shared among the various processors. Whether used individually, or as part of group, processors make use of sequential logic circuits, internal memory, and the like, to execute program instructions and operate on input data, which may be represented in a binary numeral system. Processors are often characterized by the size of individual data objects, such as, 16-bits, for example.

Modern processors typically include various functional blocks, each with a dedicated task. For example, a processor may include and instruction fetch unit, a memory management unit, and an arithmetic logic unit (ALU). An instruction fetch unit may prepare program instructions for execution by decoding the program instructions and checking for scheduling hazards, while arithmetic operations such as addition, subtraction, and Boolean operations (e.g., AND, OR, etc.) may be performed by an ALU. Some processors include high-speed memory (commonly referred to as "cache memories" or "caches") used for storing frequently used instructions or data.

As the size of data objects increased, numbers could be represented in different formats allowing for greater precision and accuracy. The processing of such data objects may require multiple program instructions in order to complete a desired function. For example, in some bit slice applications, by executing multiple program instructions over multiple processing cycles on a processor designed process 16-bit data objects, a 32-bit data object may be processed.

Some processors may employ coprocessors, or other dedicated hardware, to perform more complicated arithmetic operations, such as, floating-point multiplication for example. Such coprocessors may be fabricated on a separate integrated circuit chip, or may be included as a separate functional block within a processor. While the use of dedicated arithmetic hardware may result in improved computation performance in some applications, the format of numbers being processed may be specific to a given hardware implementation. In such cases, additional program instructions may be required to allow different processor hardware to operate on a common set of data objects.

SUMMARY

Various embodiments of an apparatus and a method for processing machine independent number formats are disclosed. Broadly speaking, a method and apparatus are contemplated in which a processor includes a floating point unit and a number unit. The number unit may be configured to receive an operation, and a first and a second operand. Each of the received operands may include a sign and exponent block, a length block, and one or more mantissa digits. The number unit may be configured to perform the received operation on the first operand and the second operand to generate a first result which includes a sign and exponent block, a length block, and one or more mantissa digits. The number unit may be further configured to process each of the first and second operands responsive to a determination that the first and second operands are fixed-length numbers. In further response to the determination that the first and second operands are fixed-length numbers, the number unit may be further configured to perform received operation on the processed first and second operands to generate a result, which includes a sign and exponent block, and one or more mantissa digits.

In a non-limiting embodiment, the number unit may be further configured to clear unused mantissa digits of the result in response to a determination that a number of used digits in the result is less than a predetermined value.

In one implementation, the number unit may be further to clear an unused mantissa digit of the first operand in response to a determination that a length of the first operand is less than a predetermined value. The number unit may be further configured to clear an unused mantissa digit of the second operand in response to a determination that a length of the second operand is less than the predetermined value.

In another non-limiting embodiment, the number unit may be further configured to clear terminating and non-terminating digits of the first operand in response to a determination that the first operand is negative. The number unit may be further configured to clear terminating and non-terminating digits of the second operand in response to a determination that the second operand is negative.

Figure 1:
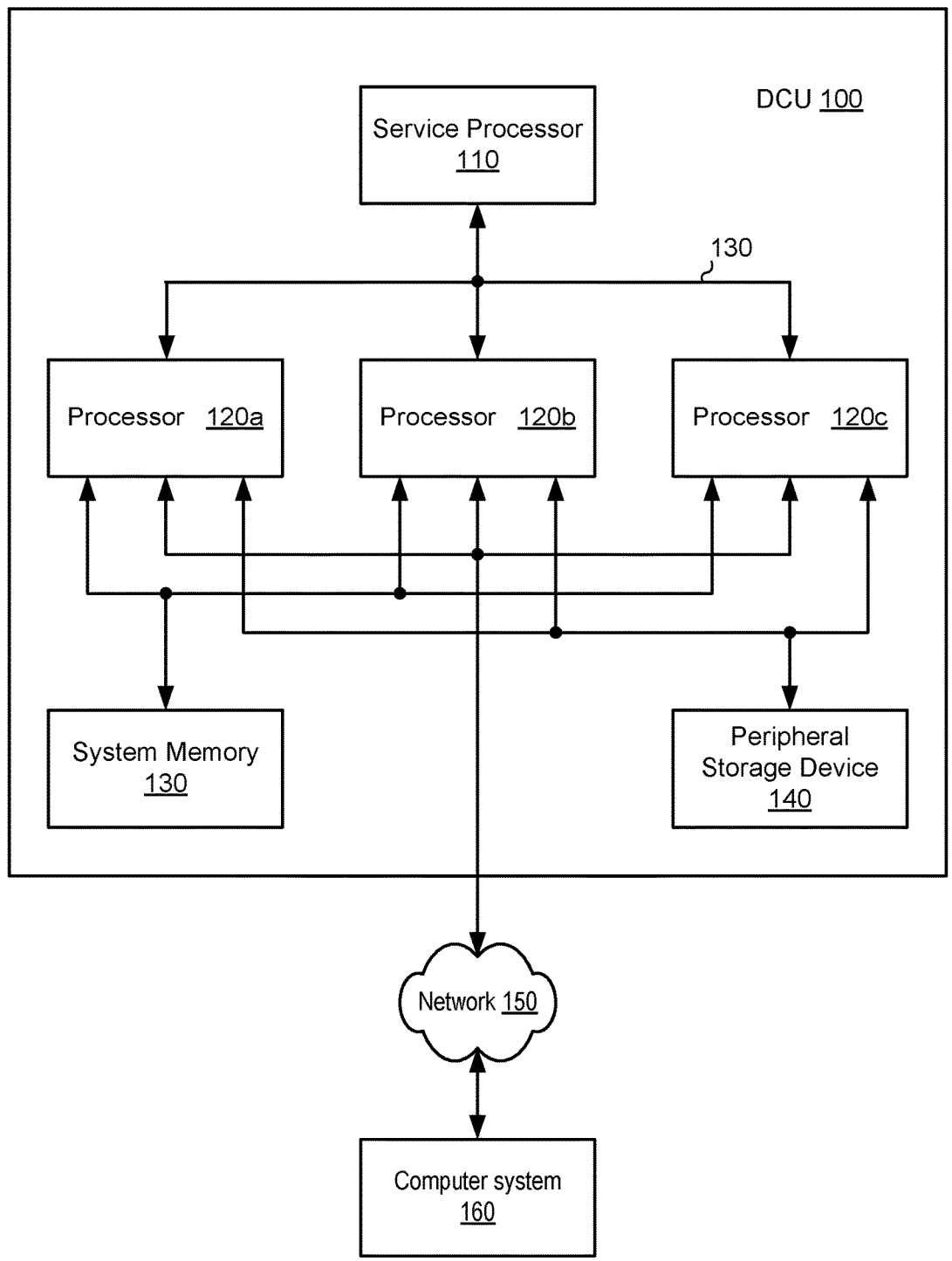
FIG. 1 is a block diagram of an embodiment of a distributed computing unit.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112, paragraph six, interpretation for that unit/circuit/component.

DETAILED DESCRIPTION OF EMBODIMENTS

In a computing system, numeric values may be stored and processed using various encodings of bit patterns. As such different processor implementations may have different representations of a given numeric value. Moreover some processors may allow for multiple representations of numbers and the various representations may be not be compatible between different computing systems. Machine independent representations of numbers may be employed, however, the use of such representations may require additional program instructions to process the machine independent formats. Additional instructions may result in a reduction in computing performance. The embodiments illustrated in the drawings and described below may provide techniques for processing machine independent variable length numbers without a loss of computing performance.

A block diagram illustrating one embodiment of a distributed computing unit (DCU) 100 is shown in FIG. 1. In the illustrated embodiment, DCU 100 includes a service processor 110, coupled to a plurality of processors 120*a-c* through scalable system interface (SSI) 130. Processors 120*a-c* are in turn coupled to system memory 130, and peripheral storage device 140. DCU 100 is coupled to a network 150, which is, in turn coupled to a computer system 160. In various embodiments, DCU 100 may be configured as a rack-mountable server system, a standalone system, or in any suitable form factor. In some embodiments, DCU 100 may be configured as a client system rather than a server system.

System memory 130 may include any suitable type of memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. It is noted that although one system memory is shown, in various embodiments, any suitable number of system memories may be employed.

Peripheral storage device 140 may, in some embodiments, include magnetic, optical, or solid-state storage media such as hard drives, optical disks, non-volatile random-access memory devices, etc. In other embodiments, peripheral storage device 140 may include more complex storage devices such as disk arrays or storage area networks (SANs), which may be coupled to processors 120*a-c* via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processors 120*a-c*, such as multi-media devices, graphics/display devices, standard input/output devices, etc.

In one embodiment, service processor 110 may include a field programmable gate array (FPGA) or an application specific integrated circuit (ASIC) configured to coordinate initialization and boot of processors 120*a-c*, such as from a power-on reset state. Additionally, in some embodiments, service processor 110 may include a programmable read-only memory (PROM) that may store instructions to perform a power-on self-test (POST). In various embodiments, service processor 110 may be configured to allow access to administrative functions such as test and debug modes of processors 120*a-c*, such as testing cache memories in processors 120*a-c*, or providing test code to processors 120*a-c* such that each of processors 120*a-c* may test their respective cache memories, for example.

As described in greater detail below, each of processors 120*a-c* may include one or more processor cores and cache memories. In some embodiments, each of processors 120*a-c* may be coupled to a corresponding system memory, while in other embodiments, processors 120*a-c* may share a common system memory. Processors 120*a-c* may be configured to work concurrently on a single computing task and may communicate with each other through SSI bus 130 to coordinate processing on that task. For example, a computing task may be divided into three parts and each part may be assigned to one of processors 120*a-c*. Alternatively, processors 120*a-c* may be configured to concurrently perform independent tasks that require little or no coordination among processors 120*a-c*.

The embodiment of the distributed computing system illustrated in FIG. 1 is one of several examples. In other embodiments, different numbers and configurations of components are possible and contemplated.

Processor Overview

Figure 2:
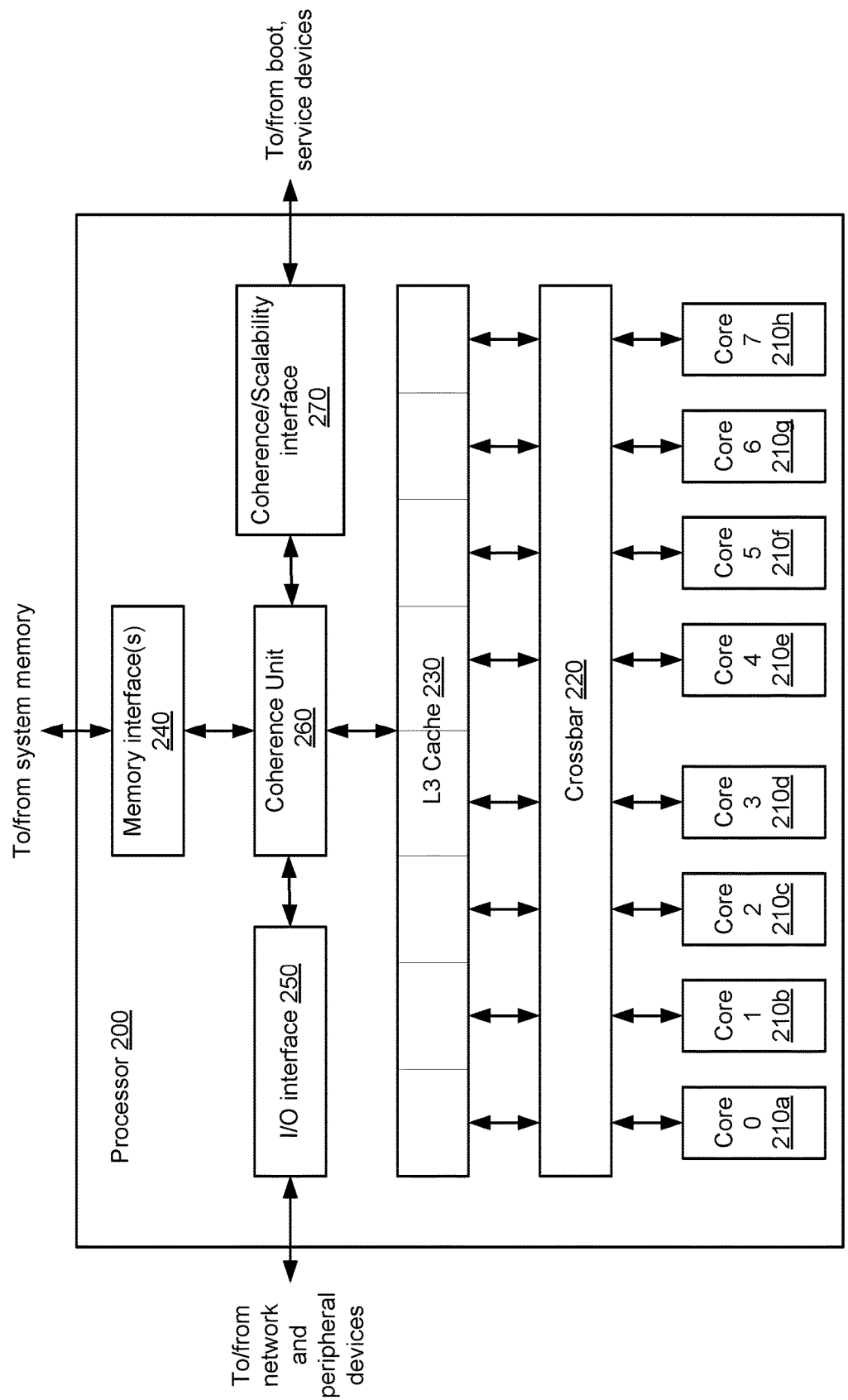
FIG. 2 is a block diagram of an embodiment of a processor.

A block diagram illustrating one embodiment of a multithreaded processor 200 is shown in FIG. 2. In some embodiments, processor 200 may correspond to processors 120*a-c* of DCU 100 in FIG. 1. In the illustrated embodiment, processor 200 includes a plurality of processor cores 210*a-h*, which are also designated "core 0" though "core 7." It is noted that although 8 cores are shown, in various embodiments, any suitable number of processor cores may be employed. Each of cores 210 is coupled to an L3 cache 230 via a crossbar 220. L3 cache 230 is coupled to coherence unit 260, which is in turn coupled to input/output (I/O) interface 250, coherence/scalability interface 270. Additionally, coherence unit 260 is coupled to one or more memory interface(s) 240, which are coupled in turn to one or more banks of system memory (not shown). As described in greater detail below, I/O interface 250 may couple processor 200 to peripheral devices, and a network. Coherence/scalability interface 270 may couple processor 200 to boot and/or service devices such as, e.g., service processor 110 in DCU 100. In some embodiments, the elements included in processor 200 may be fabricated as part of a single integrated circuit (IC), for example on a single semiconductor die.

Cores 210 may be configured to execute instructions and to process data according to a particular instruction set architecture (ISA). In one embodiment, cores 210 may be configured to implement the SPARC® V9 ISA, although in other embodiments it is contemplated that any desired ISA may be employed, such as x86, PowerPC® or MIPS®, for example. In the illustrated embodiment, each of cores 210 may be configured to operate independently of the others, such that all cores 210 may execute in parallel. Additionally, in some embodiments each of cores 210 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 210 may also be referred to as a multithreaded (MT) core. In one embodiment, each of cores 210 may be configured to concurrently execute instructions from eight threads, for a total of 64 threads concurrently executing across processor 200. However, in other embodiments it is contemplated that other numbers of cores 210 may be provided, and that cores 210 may concurrently process different numbers of threads.

Crossbar 220 may be configured to manage data flow between cores 210 and the shared L3 cache 230. In one embodiment, crossbar 220 may include logic (such as multiplexers or a switch fabric, for example) that allows any core 210 to access any bank of L3 cache 230, and that conversely allows data to be returned from any L3 bank to any core 210. Crossbar 220 may be configured to concurrently process data requests from cores 210 to L3 cache 230 as well as data responses from L3 cache 230 to cores 210. In some embodiments, crossbar 220 may include logic to queue data requests and/or responses, such that requests and responses may not block other activity while waiting for service. Additionally, in one embodiment crossbar 220 may be configured to arbitrate conflicts that may occur when multiple cores 210 attempt to access a single bank of L3 cache 230.

L3 cache 230 may be configured to cache instructions and data for use by cores 210. In the illustrated embodiment, L3 cache 230 may be organized into eight separately addressable banks that may each be independently accessed, such that in the absence of conflicts, each bank may concurrently return data to a respective core 210. In some embodiments, each individual bank may be implemented using set-associative or direct-mapped techniques. For example, in one embodiment, L3 cache 230 may be a 48 megabyte (MB) cache, where each bank is 16-way set associative with a 64-byte line size, although other cache sizes and geometries are possible and contemplated. L3 cache 230 may be implemented in some embodiments as a writeback cache in which written (dirty) data may not be written to system memory until a corresponding cache line is evicted.

In some embodiments, L3 cache 230 may be configured to operate in a diagnostic mode that allows direct access to the cache memory. For example, in such a mode, L3 cache 230 may permit the explicit addressing of specific cache structures such as individual sets, banks, ways, etc., in contrast to a conventional mode of cache operation in which some aspects of the cache may not be directly selectable (such as, e.g., individual cache ways). The diagnostic mode may be implemented as a direct port to L3 cache 230 that may be used by, for example, service processor 110 to store data into L3 cache 230. Alternatively, crossbar 220 may be configured to allow direct access to L3 cache 230 by processor cores 210 or through network interface 270 or I/O interface 250.

L3 cache 230 may be further configured to implement a built-in self-test (BIST). An address generator, a test pattern generator, and a BIST controller may be included in L3 cache 230. The address generator, test pattern generator, and BIST controller may be implemented in hardware, software, or a combination thereof. The BIST may perform tests such as, e.g., checkerboard, walking I/O, sliding diagonal, and the like, to determine that data storage cells within L3 cache 230 are capable of storing both a logical 0 and logical 1. In the case where the BIST determines that not all data storage cells within L3 cache 230 are functional, a flag or other signal may be sent to service processor 110 or one or more of processor cores 210 indicating that L3 cache 230 is faulty.

In some embodiments, L3 cache 230 may implement queues for requests arriving from and results to be sent to crossbar 220. Additionally, in some embodiments L3 cache 230 may implement a fill buffer configured to store fill data arriving from memory interface 240, a writeback buffer configured to store dirty evicted data to be written to memory, and/or a miss buffer configured to store L3 cache accesses that cannot be processed as simple cache hits (e.g., L3 cache misses, cache accesses matching older misses, accesses such as atomic operations that may require multiple cache accesses, etc.). L3 cache 230 may variously be implemented as single-ported or multiported (i.e., capable of processing multiple concurrent read and/or write accesses). In either case, L3 cache 230 may implement arbitration logic to prioritize cache access among various cache read and write requestors.

Memory interface 240 may be configured to manage the transfer of data between L3 cache 230 and system memory, for example, in response to L3 fill requests and data evictions. In some embodiments, multiple instances of memory interface 240 may be implemented, with each instance configured to control a respective bank of system memory. Memory interface 240 may be configured to interface to any suitable type of system memory, such as described above in reference to FIG. 1. In some embodiments, memory interface 240 may be configured to support interfacing to multiple different types of system memory.

In the illustrated embodiment, processor 200 may also be configured to receive data from sources other than system memory. I/O interface 250 may be configured to provide a central interface for such sources to exchange data with cores 210 and/or L3 cache 230 via coherence unit 260. In some embodiments, I/O interface 250 may be configured to coordinate Direct Memory Access (DMA) transfers of data between external peripherals and system memory via coherence unit 260 and memory interface 240. In addition to coordinating access between crossbar 220 and other interface logic, in one embodiment I/O interface 250 may be configured to couple processor 200 to external boot and/or service devices. For example, initialization and startup of processor 200 may be controlled by an external device (such as, e.g., a FPGA) that may be configured to provide an implementation- or system-specific sequence of boot instructions and data. Such a boot sequence may, for example, coordinate reset testing, initialization of peripheral devices and initial execution of processor 200, before the boot process proceeds to load data from a disk or network device. Additionally, in some embodiments such an external device may be configured to place processor 200 in a debug, diagnostic, or other type of service mode upon request.

I/O interface 250 may be configured to coordinate data transfer between processor 200 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, I/O interface 250 may implement one or more instances of an interface such as Peripheral Component Interface Express (PCI Express), although it is contemplated that any suitable interface standard or combination of standards may be employed. For example, in some embodiments I/O interface 250 may be configured to implement a version of Universal Serial Bus (USB) protocol or IEEE 1394 (Firewire®) protocol in addition to or instead of PCI Express.

I/O interface 250 may also be configured to coordinate data transfer between processor 200 and one or more devices (e.g., other computer systems) coupled to processor 200 via a network. In one embodiment, I/O interface 250 may be configured to perform the data processing in order to implement an Ethernet (IEEE 802.3) networking standard such as Gigabit Ethernet or 10-Gigabit Ethernet, for example, although it is contemplated that any suitable networking standard may be implemented. In some embodiments, I/O interface 250 may be configured to implement multiple discrete network interface ports.

Core Overview

Figure 3:
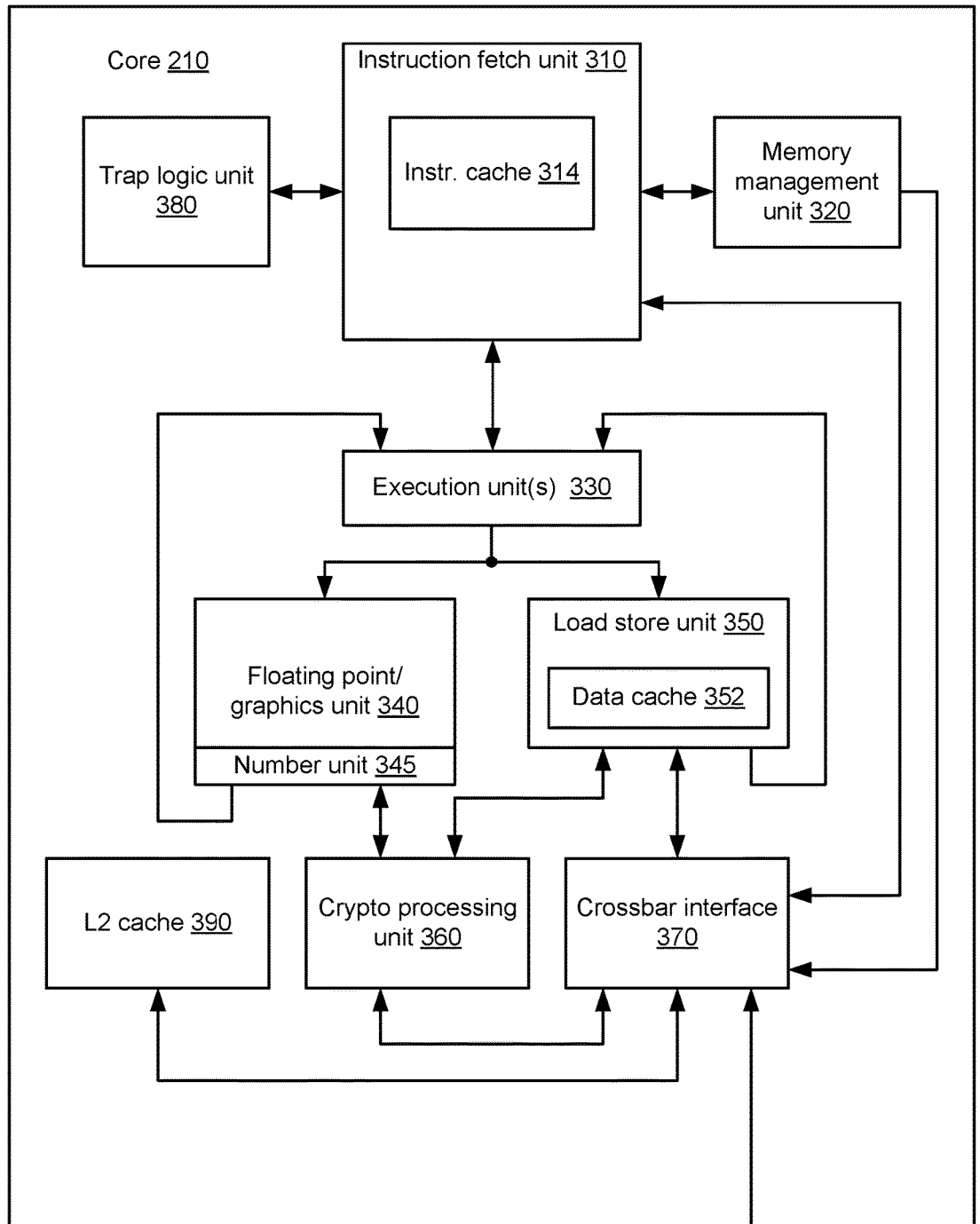
FIG. 3 is a block diagram of an embodiment of a processor core.

A possible embodiment of core 210 configured is illustrated in FIG. 3. In the illustrated embodiment, core 210 includes an instruction fetch unit (IFU) 310 coupled to a memory management unit (MMU) 320, a crossbar interface 370, a trap logic unit (TLU) 380, a L2 cache memory 390, and a plurality of execution units 330. Execution unit 330 is coupled to both a floating point/graphics unit (FGU) 340 and a load store unit (LSU) 350. Each of the latter units is also coupled to send data back to each of execution units 330. Both FGU 340 and LSU 350 are coupled to a crypto processing unit 360. FGU 340 includes number unit 345. Additionally, LSU 350, crypto processing unit 360, L2 cache memory 390 and MMU 320 are coupled to crossbar interface 370, which may in turn be coupled to crossbar 220 as shown in FIG. 2.

Instruction fetch unit 310 may be configured to provide instructions to the rest of core 210 for execution. In the illustrated embodiment, IFU 310 may be configured to perform various operations relating to the fetching of instructions from cache or memory, the selection of instructions from various threads for execution, and the decoding of such instructions prior to issuing the instructions to various functional units for execution. Instruction fetch unit 310 further includes an instruction cache 314. In one embodiment, IFU 310 may include logic to maintain fetch addresses (e.g., derived from program counters) corresponding to each thread being executed by core 210, and to coordinate the retrieval of instructions from instruction cache 314 according to those fetch addresses. Additionally, in some embodiments IFU 310 may include logic to predict branch outcomes and/or fetch target addresses, such as a Branch History Table (BHT), Branch Target Buffer (BTB), or other suitable structure, for example.

In one embodiment, IFU 310 may be configured to maintain a pool of fetched, ready-for-issue instructions drawn from among each of the threads being executed by core 210. For example, IFU 310 may implement a respective instruction buffer corresponding to each thread in which several recently-fetched instructions from the corresponding thread may be stored. In some embodiments, IFU 310 may be configured to select multiple ready-to-issue instructions and concurrently issue the selected instructions to various functional units without constraining the threads from which the issued instructions are selected. In other embodiments, thread-based constraints may be employed to simplify the selection of instructions. For example, threads may be assigned to thread groups for which instruction selection is performed independently (e.g., by selecting a certain number of instructions per thread group without regard to other thread groups).

In some embodiments, IFU 310 may be configured to further prepare instructions for execution, for example by decoding instructions, detecting scheduling hazards, arbitrating for access to contended resources, or the like. Moreover, in some embodiments, instructions from a given thread may be speculatively issued from IFU 310 for execution. For example, a given instruction from a certain thread may fall in the shadow of a conditional branch instruction from that same thread that was predicted to be taken or not-taken, or a load instruction from that same thread that was predicted to hit in data cache 352, but for which the actual outcome has not yet been determined. In such embodiments, after receiving notice of a misspeculation such as a branch misprediction or a load miss, IFU 310 may be configured to cancel misspeculated instructions from a given thread as well as issued instructions from the given thread that are dependent on or subsequent to the misspeculated instruction, and to redirect instruction fetch appropriately.

Execution unit 330 may be configured to execute and provide results for certain types of instructions issued from IFU 310. In one embodiment, execution unit 330 may be configured to execute certain integer-type instructions defined in the implemented ISA, such as arithmetic, logical, and shift instructions. It is contemplated that in some embodiments, core 210 may include more than one execution unit 330, and each of the execution units may or may not be symmetric in functionality. Finally, in the illustrated embodiment instructions destined for FGU 340 or LSU 350 pass through execution unit 330. However, in alternative embodiments it is contemplated that such instructions may be issued directly from IFU 310 to their respective units without passing through execution unit 330.

Floating point/graphics unit 340 may be configured to execute and provide results for certain floating-point and graphics-oriented instructions defined in the implemented ISA. For example, in one embodiment FGU 340 may implement single- and double-precision floating-point arithmetic instructions compliant with a version of the Institute of Electrical and Electronics Engineers (IEEE) 754 Standard for Binary Floating-Point Arithmetic (more simply referred to as the IEEE 754 standard), such as add, subtract, multiply, divide, and certain transcendental functions. Also, in one embodiment FGU 340 may implement partitioned-arithmetic and graphics-oriented instructions defined by a version of the SPARC® Visual Instruction Set (VIS™) architecture, such as VIS™ 2.0. Additionally, in one embodiment FGU 340 may implement certain integer instructions such as integer multiply, divide, and population count instructions, and may be configured to perform multiplication operations on behalf of stream processing unit 240. Depending on the implementation of FGU 360, some instructions (e.g., some transcendental or extended-precision instructions) or instruction operand or result scenarios (e.g., certain denormal operands or expected results) may be trapped and handled or emulated by software.

In the illustrated embodiment, FGU 340 may be configured to store floating-point register state information for each thread in a floating-point register file. In one embodiment, FGU 340 may implement separate execution pipelines for floating point add/multiply, divide/square root, and graphics operations, while in other embodiments the instructions implemented by FGU 340 may be differently partitioned. In various embodiments, instructions implemented by FGU 340 may be fully pipelined (i.e., FGU 340 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

As described below in more detail, number unit 345 may be configured to execute and provide results for special instructions included within the implemented ISA. The instructions may, in various embodiments, be directed towards the processing of both fixed and variable length machine independent numbers. Such numbers may be used in various applications, such as, e.g., databases, to allow numbers to be shared across different hardware platforms. Number unit 345 may be included within FGU 340 or, in other embodiments, number unit 345 may be a separate functional block.

In the illustrated embodiment, number unit 345 may be configured to change formats of, or clear (i.e., set to zero) individual mantissa bytes within machine independent numbers. Number unit 345 may include dedicated logic circuits for performing addition, multiplication, and the like. In other embodiments, number unit 345 may share arithmetic circuitry with another floating-point unit, such as, FGU 340, for example.

Load store unit 350 may be configured to process data memory references, such as integer and floating-point load and store instructions as well as memory requests that may originate from stream processing unit 360. In some embodiments, LSU 350 may also be configured to assist in the processing of instruction cache 314 misses originating from IFU 310. LSU 350 may include a data cache 352 as well as logic configured to detect cache misses and to responsively request data from L3 cache 230 via crossbar interface 370. In one embodiment, data cache 352 may be configured as a write-through cache in which all stores are written to L3 cache 230 regardless of whether they hit in data cache 352; in some such embodiments, stores that miss in data cache 352 may cause an entry corresponding to the store data to be allocated within the cache. In other embodiments, data cache 352 may be implemented as a write-back cache.

In one embodiment, LSU 350 may include a miss queue configured to store records of pending memory accesses that have missed in data cache 352 such that additional memory accesses targeting memory addresses for which a miss is pending may not generate additional L3 cache request traffic. In the illustrated embodiment, address generation for a load/store instruction may be performed by one of EXUs 330. Depending on the addressing mode specified by the instruction, one of EXUs 330 may perform arithmetic (such as adding an index value to a base value, for example) to yield the desired address. Additionally, in some embodiments LSU 350 may include logic configured to translate virtual data addresses generated by EXUs 330 to physical addresses, such as a Data Translation Lookaside Buffer (DTLB).

Crypto processing unit 360 may be configured to implement one or more specific data processing algorithms in hardware. For example, crypto processing unit 360 may include logic configured to support encryption/decryption algorithms such as Advanced Encryption Standard (AES), Data Encryption Standard/Triple Data Encryption Standard (DES/3DES), or Ron's Code #4 (RC4). Crypto processing unit 240 may also include logic to implement hash or checksum algorithms such as Secure Hash Algorithm (SHA-1, SHA-256), Message Digest 5 (MD5), or Cyclic Redundancy Checksum (CRC). Crypto processing unit 360 may also be configured to implement modular arithmetic such as modular multiplication, reduction and exponentiation. In one embodiment, crypto processing unit 360 may be configured to utilize the multiply array included in FGU 340 for modular multiplication. In various embodiments, crypto processing unit 360 may implement several of the aforementioned algorithms as well as other algorithms not specifically described.

Crypto processing unit 360 may be configured to execute as a coprocessor independent of integer or floating-point instruction issue or execution. For example, in one embodiment crypto processing unit 360 may be configured to receive operations and operands via control registers accessible via software; in the illustrated embodiment crypto processing unit 360 may access such control registers via LSU 350. In such embodiments, crypto processing unit 360 may be indirectly programmed or configured by instructions issued from IFU 310, such as instructions to read or write control registers. However, even if indirectly programmed by such instructions, crypto processing unit 360 may execute independently without further interlock or coordination with IFU 310. In another embodiment crypto processing unit 360 may receive operations (e.g., instructions) and operands decoded and issued from the instruction stream by IFU 310, and may execute in response to such operations. That is, in such an embodiment crypto processing unit 360 may be configured as an additional functional unit schedulable from the instruction stream, rather than as an independent coprocessor.

In some embodiments, crypto processing unit 360 may be configured to freely schedule operations across its various algorithmic subunits independent of other functional unit activity. Additionally, crypto processing unit 360 may be configured to generate memory load and store activity, for example to system memory. In the illustrated embodiment, crypto processing unit 360 may interact directly with crossbar interface 370 for such memory activity, while in other embodiments crypto processing unit 360 may coordinate memory activity through LSU 350. In one embodiment, software may poll crypto processing unit 360 through one or more control registers to determine result status and to retrieve ready results, for example by accessing additional control registers. In other embodiments, FGU 340, LSU 350 or other logic may be configured to poll crypto processing unit 360 at intervals to determine whether it has results that are ready to write back. In still other embodiments, crypto processing unit 360 may be configured to generate a trap when a result is ready, to allow software to coordinate result retrieval and processing.

L2 cache memory 390 may be configured to cache instructions and data for use by execution unit 330. In the illustrated embodiment, L2 cache memory 390 may be organized into multiple separately addressable banks that may each be independently accessed. In some embodiments, each individual bank may be implemented using set-associative or direct-mapped techniques.

L2 cache memory 390 may be implemented in some embodiments as a writeback cache in which written (dirty) data may not be written to system memory until a corresponding cache line is evicted. L2 cache memory 390 may variously be implemented as single-ported or multiported (i.e., capable of processing multiple concurrent read and/or write accesses). In either case, L2 cache memory 390 may implement arbitration logic to prioritize cache access among various cache read and write requestors.

In some embodiments, L2 cache memory 390 may be configured to operate in a diagnostic mode that allows direct access to the cache memory. For example, in such a mode, L2 cache memory 390 may permit the explicit addressing of specific cache structures such as individual sets, banks, ways, etc., in contrast to a conventional mode of cache operation in which some aspects of the cache may not be directly selectable (such as, e.g., individual cache ways). The diagnostic mode may be implemented as a direct port to L2 cache memory 390. Alternatively, crossbar interface 370 or MMU 320 may be configured to allow direct access to L2 cache memory 390 via the crossbar interface.

L2 cache memory 390 may be further configured to implement a BIST. An address generator, a test pattern generator, and a BIST controller may be included in L2 cache memory 390. The address generator, test pattern generator, and BIST controller may be implemented in hardware, software, or a combination thereof. The BIST may perform tests such as, e.g., checkerboard, walking I/O, sliding diagonal, and the like, to determine that data storage cells within L2 cache memory 390 are capable of storing both a logical 0 and logical 1. In the case where the BIST determines that not all data storage cells within L2 cache memory 390 are functional, a flag or other signal may be activated indicating that L2 cache memory 390 is faulty.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 314 or data cache 352. In the event no translation for a given virtual page number is found in the appropriate TLB, memory management unit 320 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.) In some embodiments, if MMU 320 is unable to derive a valid address translation, for example if one of the memory pages including a page table is not resident in physical memory (i.e., a page miss), MMU 320 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 210 may be configured to generate off-core memory or I/O requests. For example, IFU 310 or LSU 350 may generate access requests to L3 cache 230 in response to their respective cache misses. Crypto processing unit 360 may be configured to generate its own load and store requests independent of LSU 350, and MMU 320 may be configured to generate memory requests while executing a page table walk. Other types of off-core access requests are possible and contemplated. In the illustrated embodiment, crossbar interface 370 may be configured to provide a centralized interface to the port of crossbar 220 associated with a particular core 210, on behalf of the various functional units that may generate accesses that traverse crossbar 220. In one embodiment, crossbar interface 370 may be configured to maintain queues of pending crossbar requests and to arbitrate among pending requests to determine which request or requests may be conveyed to crossbar 220 during a given execution cycle. For example, crossbar interface 370 may implement a least-recently-used or other algorithm to arbitrate among crossbar requestors. In one embodiment, crossbar interface 370 may also be configured to receive data returned via crossbar 110, such as from L3 cache 230 or I/O interface 250, and to direct such data to the appropriate functional unit (e.g., data cache 352 for a data cache fill due to miss). In other embodiments, data returning from crossbar 220 may be processed externally to crossbar interface 370.

During the course of operation of some embodiments of core 210, exceptional events may occur. For example, an instruction from a given thread that is picked for execution by pick unit 316 may be not be a valid instruction for the ISA implemented by core 210 (e.g., the instruction may have an illegal opcode), a floating-point instruction may produce a result that requires further processing in software, MMU 320 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 380 may be configured to manage the handling of such events. For example, TLU 380 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 380 may be configured to flush all instructions from the trapping thread from any stage of processing within core 210, without disrupting the execution of other, non-trapping threads. In some embodiments, when a specific instruction from a given thread causes a trap (as opposed to a trap-causing condition independent of instruction execution, such as a hardware interrupt request), TLU 380 may implement such traps as precise traps. That is, TLU 380 may ensure that all instructions from the given thread that occur before the trapping instruction (in program order) complete and update architectural state, while no instructions from the given thread that occur after the trapping instruction (in program order) complete or update architectural state.

Number Formats

Processors, such as, e.g., processor 200 as illustrated in FIG. 2, represent numerical values in a grouping of bits commonly referred to as a computer number format. Various encodings between a numeric value and a corresponding bit pattern are possible, and may depend on circuitry particular to a given processor. As such different processor implementations may have different representations of a given numeric value.

Some processors may allow for multiple representations of numbers (also referred to herein as number formats). The choice of how a given number is represented within a processor may be controlled by software. For example, a user may elect to have a certain variable within a software program stored as a fixed-point number where a fixed number of bits are used to store the integer and fractional portions of a number. For example, in a 32-bit wide processor, 16-bits may be used to store the integer portion of a number, and 16-bits may be used to store the fractional portion of the number.

To allow for a greater range of numbers to be represented within a processor, a floating-point number format may be employed. A floating-point number format may include a series of bits encoding a mantissa (or significand), a series of bits encoding an exponent, and a sign bit. Using the mantissa, exponent, and sign together, a wide range of precision numbers may be represented within a processor. Various floating-point number formats are possible, such as, Institute of Electrical and Electronics Engineers (IEEE) 754-2008 standard.

Figure 4:
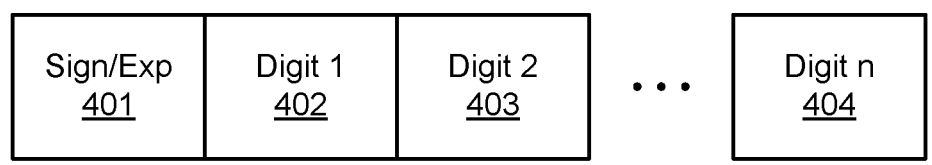
FIG. 4 illustrates a block diagram of an embodiment of a number format.

In some cases, however, the aforementioned number format may be translated from one computing system to another. For example, a numeric value represented by a 32-bit floating-point number in one computer system, may not be properly represented in a computer system, which supports 16-bit wide numbers. Moreover, some applications, such as, e.g., database storage and processing, may require specialized number formats. In such cases, a hardware independent number format may be employed. A block diagram depicting an embodiment of a machine-independent number format is illustrated in FIG. 4. In the illustrated embodiment, a numeric value is represented by a fixed number of mantissa bytes (digit block 402 through digit block 404), and sign/exponent byte (sign/exp block 401).

Each mantissa byte (also referred to herein as a "digit" or "mantissa digit") may encode a single digit between 1 and 100 of the numeric values mantissa. It is noted that each mantissa digit may include any suitable number of data bits that may be needed for the encoding scheme employed. Each digit may, in various embodiments, correspond to a base-100 value between 0 and 99, respectively, resulting in an inherent addition of one into each mantissa byte. A negative number encoded in such a format may include digits, which are in a complement form, and have values between 2 and 101. In some embodiments, a complement of a digit may be created by subtracting the digit from a value of 102.

The use of a number such as the one depicted by the block diagram of FIG. 4 may, in some embodiments, allow for different computing systems, employing different inherent processor bit-widths, to perform computations on numbers without any translation between number formats. Software program instructions may be employed to allow a given processor within a computing system to process numbers represented in the machine-independent number format. Such program instructions may, in various embodiments, reduce system performance and computational throughput.

It is noted that the block diagram illustrated in FIG. 4 is merely an example. In other embodiments, different numbers of digits and different encoding schemes may be employed.

Figure 5:
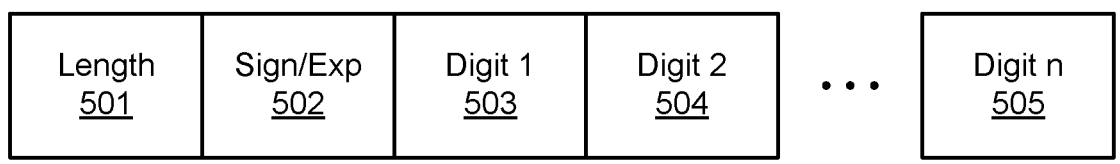
FIG. 5 illustrates a block diagram of an embodiment of another number format.

Another embodiment of a machine-independent number format is illustrated in FIG. 5. In the illustrated embodiment, a floating-point number is represented by a series of digit blocks (digit 503 through digit 505) of arbitrary length. Length block 501 encodes the number of digit blocks that are part of the floating-point number. Sign/exponent (also referred to herein as "sign and exponent") block 502 is a collection of data that encodes the sign of the floating point number as well as the exponent, i.e., the power of 100 by which the collective digit blocks are multiplied.

As with the embodiment described above in FIG. 4, each digit block (or mantissa byte) may be encoded with one of various digit formats. For example, each digit block may be encoded such that a single digit between 1 and 100 is used to store the value of the digit represented by each digit block. Each digit may, in various embodiments, correspond to a base-100 value between 0 and 99, respectively, resulting in an inherent addition of one into each mantissa byte. A negative number encoded in such a format may include digits, which are in a complement form, and have values between 2 and 101. In some embodiments, a complement of a digit may be created by subtracting the digit from a value of 102.

The value of the length byte may be adjusted or set dependent upon various arithmetic operations. Rounding or truncation operations may also affect the length byte of a number resulting from an arithmetic operation being performed on two or more operands.

The use of a number represented in a format such as the one illustrated in FIG. 5 may, in some embodiments, allow for different numbers to be represented with different precisions or accuracies dependent upon an application. For example, in some database applications, numbers in one portion of a database may require a certain accuracy, while numbers in another portion of a database may require a different accuracy.

It is noted that the number format illustrated in FIG. 5 is merely an example. In other embodiments, different numbers of digit blocks and different encoding schemes may be employed.

Processing Number Formats

Figure 6:
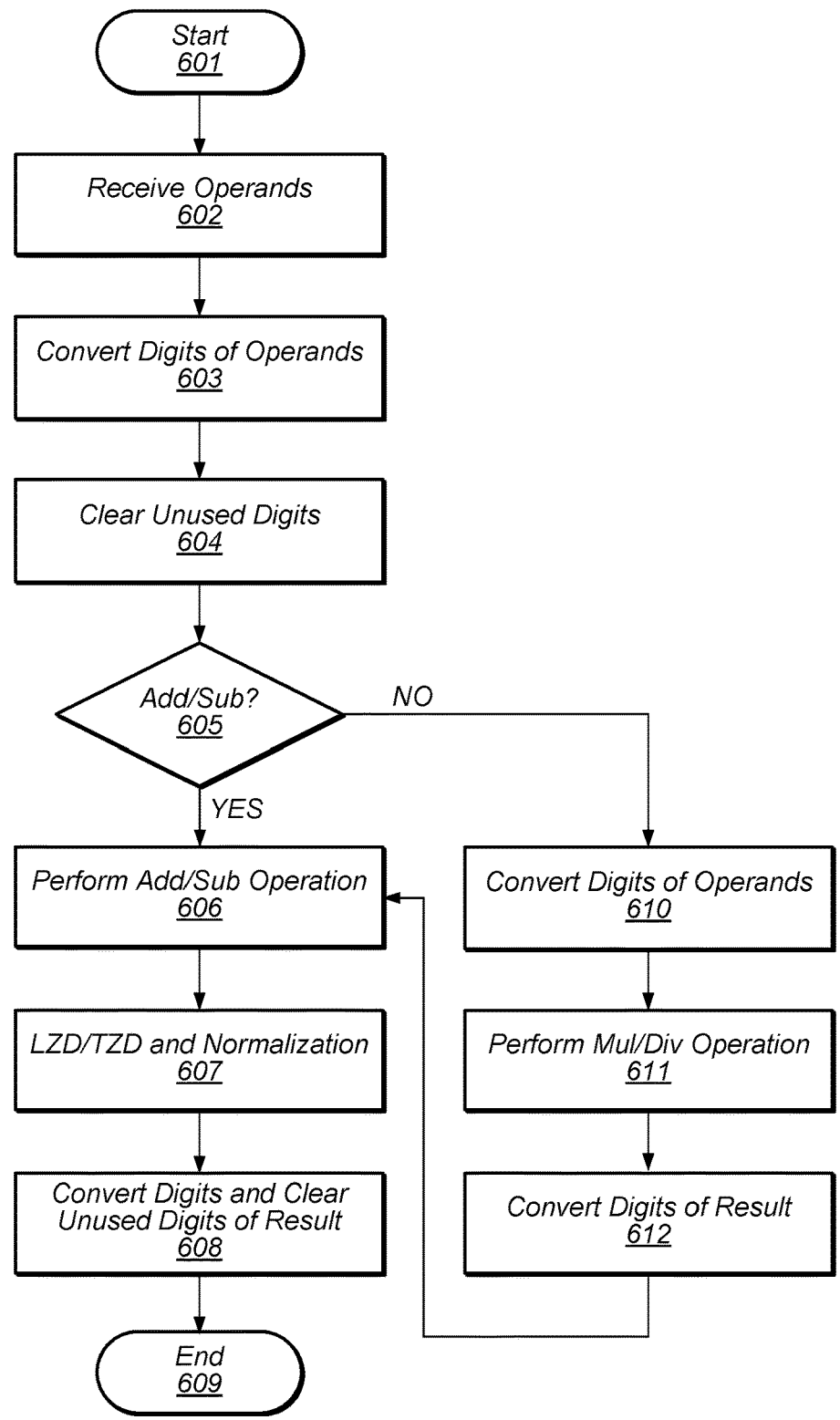
FIG. 6 illustrates a flowchart depicting an embodiment of a method for processing variable-length number format.

Turning to FIG. 6, an embodiment of a method for a processor to perform operations on variable length numbers is illustrated. In some embodiments, one or more of the following operations to process the variable length machine independent numbers may be performed by a specialized number unit, such as number unit 345, for example. The method begins in block 601. Operands may then be received (block 602). The operands may be variable length numbers, fixed length numbers, or a combination thereof. In some embodiments, operands may be received from a data cache such as, e.g., data cache 352 as illustrated in FIG. 3. The operands may, in other embodiments, be received from other memory, such as, system memory 130, for example.

The encoding of the individual mantissa bytes for each operand, such as digit 503 as illustrated in FIG. 5, may then be modified (block 603). In some embodiments, the encoding of an individual mantissa byte may be converted to binary coded centimal (BCC). BCC is an encoding scheme in which two decimal digits are stored in a single binary byte as a base-100 value, i.e., eight individual binary data bits. In other embodiments, the conversion process may include complementing mantissa bytes representing negative values and subtracting one from the value to remove the previously described inherent addition of one into each mantissa byte.

Once each of the mantissa bytes for each operand has been converted, unused mantissa bytes may be cleared (block 604). The process of clearing unused bytes may, in some embodiments, depend upon the length of each operand as indicated by a length block, such as length block 501, for example. In some embodiments, if the indicated length of an operand is less than 21, unused mantissa bytes may contain an unused value when retrieved from memory. The unused mantissa bytes, i.e., mantissa bytes between the length of the operand and the maximum allowable number of mantissa bytes, may be set to zero or any other suitable value. Any terminating or non-terminating mantissa bytes containing a value of 102 may also be cleared.

The method may then depend on the type of operation to be performed (block 605). In some embodiments, if the operation to be performed is determined to be an addition or subtraction operation, the addition or subtraction operation may then be performed (block 606). Addition and subtraction operations may, in various embodiments, be frequently used operations. As such, a number engine, such as number engine 345 as illustrated in FIG. 3, may be configured to operate directly on the BCC encoded mantissa bytes without further format changes. With a number so configured, additional latency resulting from further format conversions may, in some embodiments, be removed from the critical path of the addition and subtraction operations.

Once the addition or subtraction operation has completed, leading zero detection (LZD) and trailing zero detection (TZD) may be performed, and the result normalized (block 607). In some embodiments, logic circuits for detecting both leading and trailing zeros in parallel may be included within a number unit processing the operation. Trailing zeros may be used to determine the length of the result, and leading zeros may be used to determine a normalization amount. In some embodiments, a round increment operation may also be performed after the determination of leading and trailing zeros.

The individual mantissa bytes may then be converted back into the originally received format from the currently BCC format, and unused mantissa bytes may also be cleared (block 608). In some embodiments, the conversion back into original number format may include adding one to each mantissa byte. A complement operation may also be performed if the final result of the operation results in a negative value. When the result is negative and less than a maximum allowed length, such as, e.g., 21, a terminating mantissa byte may be appended to the results. In some embodiments, the terminating mantissa byte may contain the value 102. With each mantissa byte converted back to the originally received format, and unused bytes cleared, the method may then conclude in block 608.

If the operation to be performed is determined to be a multiplication or division operation, the format of the mantissa bytes of the operands may be converted to another format (block 610). In some embodiments, the format of each mantissa byte of each operand may be converted from BCC to binary-coded decimal (BCD). BCD is an encoding scheme in which each decimal digit (zero to 9) is represented by a fixed number of bits, such as, four bits, for example.

Once each mantissa byte of each operand has been converted, the multiplication or division operation may then be performed (block 611). In some embodiments, the multiplication operation may employ a shift/add sequential algorithm, in which each BCD digit generates one or two partial products. This iterative method may employ carry-save addition as well as fast generation of multiplicand multiples. In some embodiments, the multiples are not stored for subsequent loops. The aforementioned BCC adder used for addition and subtraction operations may, in various embodiments, be used to perform the final carry-propagate.

In some embodiments, the division operation may utilize a shift/subtract sequential restoring operation. Such an algorithm may require a look-up table for each BCD digit as well as one to three subtract operations. Carry-propagate subtraction may be employed, in some embodiments.

A single partial product generator may be shared between circuits dedicated to performing the multiplication and division operations. In some embodiments, the partial product generator may generate 2×, 4×, and 5× multiples on demand during the execution of the iterative loops of the multiplication and division algorithms. Other multiples, such as, e.g., 3×, may be calculated based on the previously mentioned multiples and stored. In other embodiments, the 6× multiple may be generated on demand using the stored 3× multiple. If other multiples are needed, the multiplication and division algorithms may generate them on demand using the aforementioned multiples.

Once the iterative portion of the multiplication and division algorithms have completed, the format of each mantissa byte of the result may then be converted (block 612). In some embodiments, the format of each mantissa byte may be converted into BCC or any other suitable format. With the format of each mantissa byte of the result converted, the operation may proceed as above from block 606 with the aforementioned BCC adder of the number engine performing the last carry-propagate of a multiplication operation, or performing a round increment of a division operation.

It is noted that the operation of the method illustrated in FIG. 6 are depicted as being performed in a sequential fashion. In other embodiments, one or more of the operations may be performed in parallel.

Dedicated hardware to process a particular number format may, in various embodiments, result in additional chip area and power. The additions to area and power may, in some cases, be offset by employing the dedicated hardware to process multiple number formats. For example, a number unit designed for performing operations using variable-length operands, such as described in FIG. 6, may be modified to perform operations using both variable-length and fixed-length operands.

Figure 7:
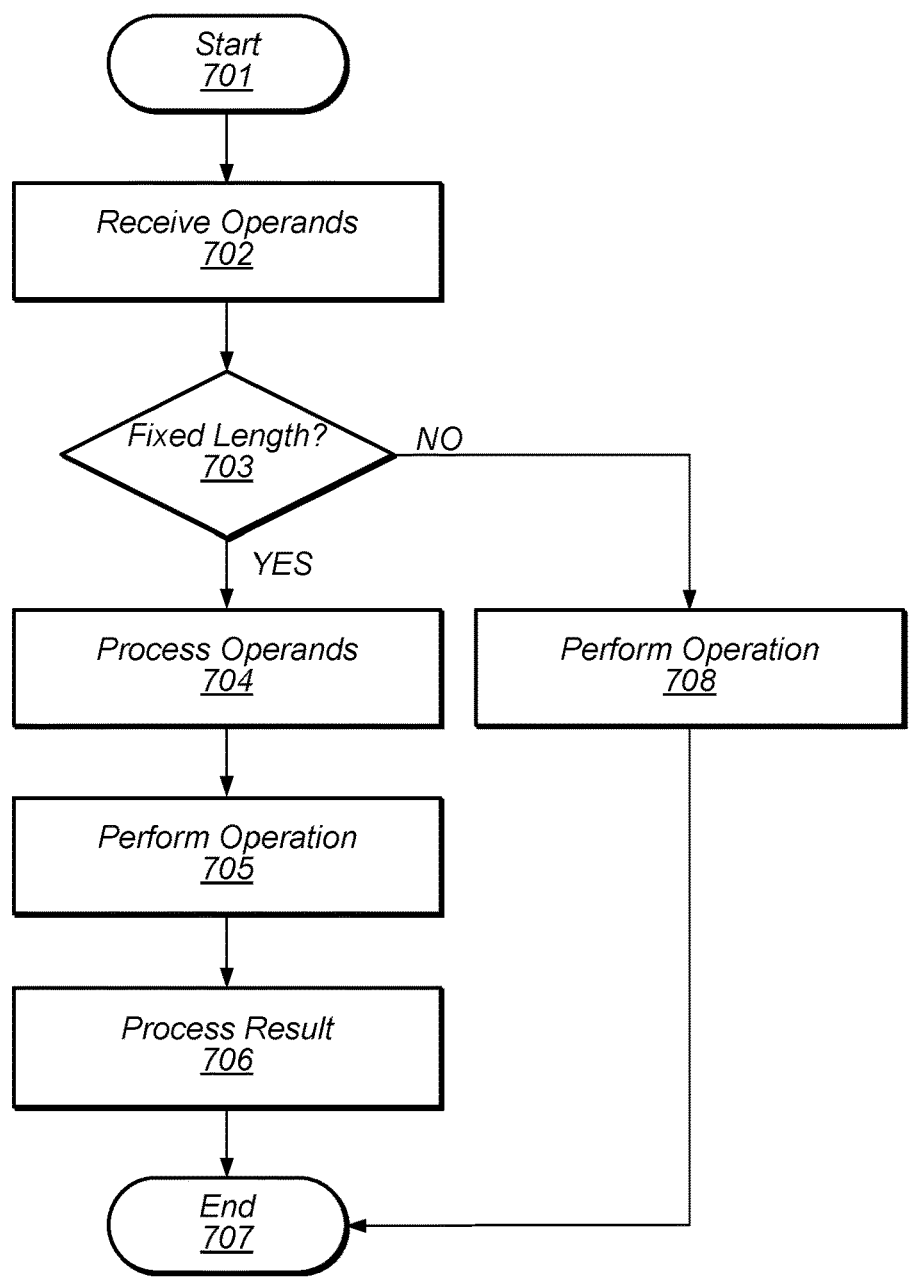
FIG. 7 illustrates a flowchart depicting an embodiment of a method for processing fixed-length and variable-length number formats.

In some cases, both fixed-length and variable-length machine independent numbers may need to be processed. A number unit, such as number unit 345 as illustrated in FIG. 3, may be used to process both fixed-length and variable-length machine independent numbers. A flowchart depicting an embodiment of a method for processing variable-length and fixed-length operands is illustrated in FIG. 7. The method begins in block 701.

The number unit may then receive operands (block 702). In some embodiments, the operands may be variable-length operands, fixed-length operands, or a combination thereof. An operator may, in various embodiments, also be received. The number unit may be a standalone unit or, in other embodiments, the number unit may be included as part of a floating-point unit, graphics processing unit, or any other suitable functional block within a processor core, such as, processor core 301 as illustrated in FIG. 3, for example.

The method may then depend on the length type of the received operands (block 703). If the operands are variable-length operands, the operation indicated by the received operator may then be performed (block 708). In some embodiments, block 708 may correspond to operations 603 through 612 as depicted in the flowchart illustrated in FIG. 6. Once the operation has been completed, the method may conclude in block 707.

If the received operands are fixed-length operands, then each one of the operands may then be pre-processed to make them compatible with the variable-length number engine (block 704). As will be described below in more detail, the pre-processing may, in some embodiments, include clearing one or more mantissa bytes of the operands.

Once the received operands have been pre-processed, the designated operation may then be performed (block 705). As described above in regard to block 708, block 705 may, in various embodiments, correspond to operations 603 through 612 as depicted in the flowchart illustrated in FIG. 6.

With the completion of the designated operation, the result may then be re-formatted to match the format of the originally received operands (block 706). In some embodiments, the re-formatting may include converting a variable-length number into a fixed-length number. As will be described below in more detail, the re-formatting process may include appending a termination byte at a determined location within the mantissa bytes. Once the format of the result has been adjusted to match the format of the originally received operands, the method may conclude in block 707.

It is noted that method illustrated in FIG. 7 is merely an example. In other embodiments, different operations and different orders of operations are possible and contemplated.

Figure 8:
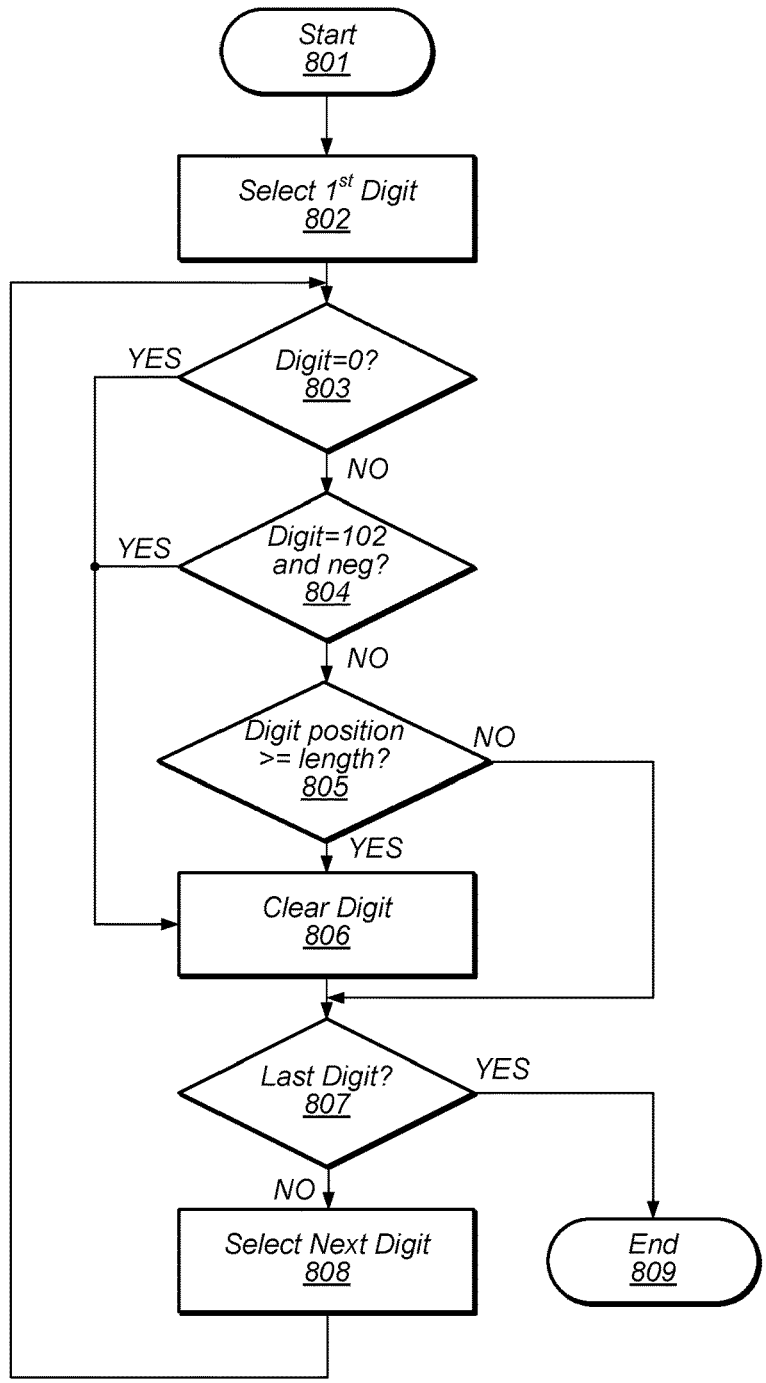
FIG. 8 illustrates a flowchart depicting an embodiment of a method for processing fixed-length operands prior to performing an operation.

Turning to FIG. 8, a method for processing fixed-length operands using a floating-point unit configured to process variable-length operands is illustrated. In some embodiments, the method illustrated in FIG. 8 may correspond to the process operands operation as depicted in block 704 of the flowchart illustrated in FIG. 7. Each operand may be processed as described below.

The first mantissa byte of an operand is selected (block 802). The method may then depend on a value of the selected mantissa byte (block 803). In some embodiments, if the value of the selected mantissa byte is zero, then the mantissa byte may be cleared (block 806). Prior to the mantissa byte being cleared, the format may be converted to BCC, which may, in various embodiments, include complementing the value and subtracting one from the value.

The method may then depend on which mantissa byte is currently selected (block 807). If the currently selected mantissa byte is the last mantissa byte of the operand currently being processed, then the method may conclude in block 809. When the currently selected mantissa byte is not the last mantissa byte of the operand currently being processed, a next mantissa byte is selected (block 808), and method continues from block 803 as described above.

When the value of the currently selected mantissa byte is non-zero, the method may again depend on the value of the currently selected mantissa byte (block 804). In some embodiments, if the value of currently selected mantissa byte is equal to 102 (either in a terminating or non-termination capacity) and the operand currently being processed is negative, then the currently selected mantissa byte is cleared (block 806). As described above, clearing the currently selected mantissa byte may include a format conversion to BCC. Once the currently selected mantissa byte has been cleared, the method may proceed, as described above, from block 806.

If the operand currently being processed is positive, or the value of the currently selected mantissa byte is not 102, then the method may depend on the position of the currently selected mantissa byte (block 805). If the position of the currently selected mantissa byte is greater or equal to the length of the operand currently being processed, then the currently selected mantissa byte is cleared (block 806). As described above, clearing the currently selected mantissa byte may include a format conversion to BCC. Once the currently selected mantissa byte has been cleared, the method may proceed, as described above, from block 806.

If the position of the currently selected mantissa byte is less than the length of the operand currently being processed, then the method may depend on which mantissa byte is currently selected (block 807), and the method may then proceed from block 807 as described above.

It is noted that the method illustrated in FIG. 8 is merely an example. Different operations and different orders of operations may be employed in various other embodiments.

As described above, fixed-length numbers may be pre-processed such that they may be used by a number engine designed to process variable-length numbers. In such cases, the result may be in a variable-length format, and may need to be converted back into a fixed-length format. An embodiment of a method for processing a variable-length result into a fixed-length result is depicted in the flowchart illustrated in FIG. 9. In some embodiments, the method illustrated in FIG. 9 may correspond to the process result operation as depicted in block 706 of the flowchart illustrated in FIG. 7. The method begins in block 901. A first digit to be processed may then be selected (block 911).

The method may then depend on the sign of the result being processed (block 902). When the result being processed is positive, a current value of the length of the result is set to an intermediate value (block 908). Prior to accessing the result, the format may be converted from BCC to the format of the originally received operands. In some embodiments, the format conversion may include the addition of one to the value of the currently selected mantissa digit as well as complementing the value of the currently selected mantissa byte if the final result is negative. The method may then depend on the position of the currently selected mantissa byte (block 909). When the position of the currently selected mantissa digit is greater than or equal to the current value of the length of the result, the value of the currently selected mantissa digit may then be cleared (block 910). Once the currently selected mantissa digit has been cleared, the method may then depend on the current digit position.

When the current digit position is the last digit position, the method may conclude in block 907. If the current digit position is not the last digit position, the next digit may then be selected (block 913), and the method may continue from block 902 as described above. When the position of the currently selected mantissa byte is less than current length value, the method may from block 912 as described above.

If the result being processed is negative, the method may then depend on a value of the intermediate length (block 903). In some embodiments, when the intermediate length is greater than or equal to a maximum value, such as, e.g., 21, the method may proceed as described above from block 908. When the intermediate length is less than the maximum value, the method may then depend on the position of the currently selected mantissa digit within the overall result (block 904).

When the position of the currently selected mantissa digit is not equal to the intermediate length, the method may proceed as described above from block 908. If the position of the currently selected mantissa digit is equal to the intermediate length, then the current value of the length of the result is updated (block 905). In some embodiments, the current value of the length of the result is set equal to the intermediate length value plus one. Once the current value of the length of the result has been updated, the value of the currently selected mantissa digit is set to a termination value, such as, e.g., 102 (block 906). Once the termination value has been set, the method may proceed from block 912 as described above.

Figure 9:
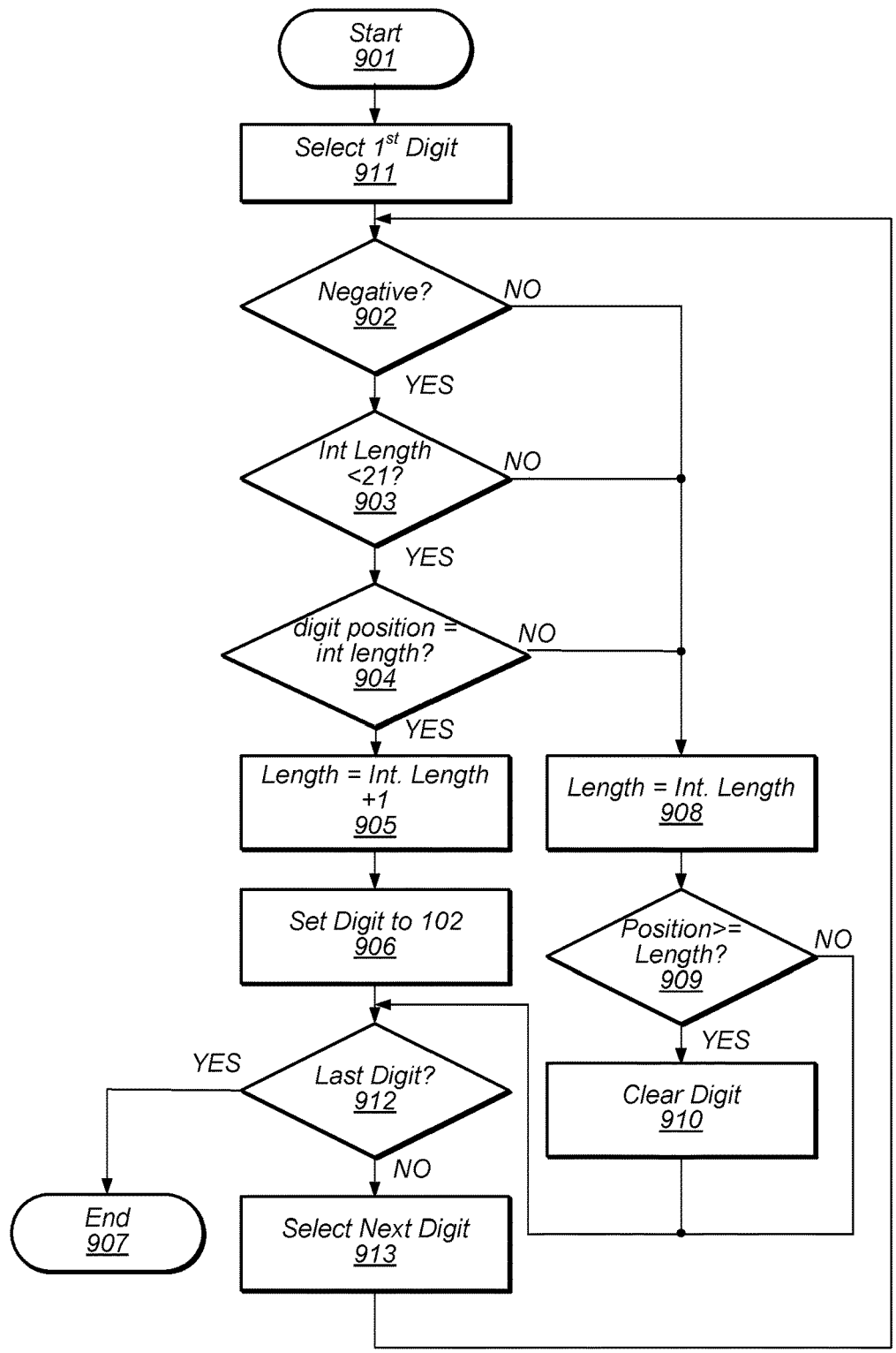
FIG. 9 illustrates a flowchart depicting an embodiment of a method for processing the result of an operation performed on two fixed-length operands.

It is noted the method depicted in the flowchart illustrated in FIG. 9 is merely an example. In other embodiments, different operations and different orders of operations are possible and contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor, comprising:
    a floating point unit;
    a logic circuit coupled to the floating point unit, wherein the logic circuit is configured to:
        receive an operation, a first operand and a second operand, wherein each of the first operand and the second operand include a sign and exponent block, and one or more mantissa digits;
        in response to a determination that the first operand and the second operand are fixed-length numbers:
            process the first operand to generate a first processed operand;
            process the second operand to generate a second processed operand; and
            perform the operation using the first processed operand and the second processed operand to generate a result, wherein the result includes a sign and exponent block, and one or more mantissa digits.

2. The processor of claim 1, wherein the logic circuit is further configured to clear unused mantissa digits included in the result.

3. The processor of claim 2, wherein to clear the unused mantissa digits included in the result, the logic circuit is further configured to convert a format of each unused mantissa digit from a first format to a second format.

4. The processor of claim 1, wherein to process the first operand, the logic circuit is further configured to clear unused mantissa digits included in the first operand, and wherein to process the second operand, the logic circuit is further configured to clear unused mantissa digits included in the second operand.

5. The processor of claim 1, wherein to process the first operand, the logic circuit is further configured to clear terminating and non-terminating digits included in the first operand in response to a determination that the first operand is negative, and wherein to process the second operand, the logic circuit is further configured to clear terminating and non-terminating digits included in the second operand in response to a determination that the second operand is negative.

6. The processor of claim 1, further comprising a load store unit configured to retrieve the first operand and the second operand from a memory in response to the processor executing one or more instructions associated with processing a database, wherein the first operand is associated with a first number in the database, and the second operand is associated with a second number in the database, and wherein the database includes at least one fixed-length number and at least one variable-length number.

7. A method for operating a processor, wherein the processor includes a floating point unit and a logic circuit, the method comprising:
    the logic circuit receiving an operation, a first operand and a second operand, wherein each of the first operand and the second operand include a sign and exponent block, and one or more mantissa bytes;
    in response to a determination that the first operand and the second operand are fixed-length numbers:
        processing, by the logic circuit, the first operand to generate a first processed operand;
        processing, by the logic circuit, the second operand to generate a second processed operand; and
        performing, by the logic circuit, operation using the first processed operand and the second processed operand to generate a result, wherein the result includes a sign and exponent block, and one or more mantissa digits.

8. The method of claim 7, further comprising, clearing, by the logic circuit, unused mantissa digits included in the result.

9. The method of claim 8, wherein clearing the unused mantissa digits included in the result includes converting, by the logic circuit, a format of each unused mantissa digit from a first format to a second format.

10. The method of claim 9, wherein the second format includes binary coded centimal.

11. The method of claim 9, wherein clearing the unused mantissa digits included in the result includes setting, by the logic circuit, each unused mantissa digit included in the result in response to determining the converting of the format of each unused mantissa digit included in the result has completed.

12. The method of claim 7, wherein processing the first operand includes clearing unused mantissa digits included in the first operand, and wherein processing the second operand includes clearing unused mantissa digits included in the second operand.

13. The method of claim 7, wherein the logic circuit processing each of the first operand and the second operand comprises the logic circuit clearing terminating and non-terminating digits of the first operand responsive to a determination that the first operand is negative, and the logic circuit clearing terminating and non-terminating digits of the second operand responsive to a determination that the second operand is negative.

14. The method of claim 7, further comprising retrieving from a database, a first number and a second number, wherein the first operand is associated with the first number and the second operand is associated with the second number, wherein the database includes one or more fixed-length numbers and one or more variable-length numbers.

15. A system, comprising:
    a system memory,
    a plurality of processors, wherein each processor of the plurality of processors is coupled to the system memory, and wherein each processor of the plurality of processors is configured to:
        retrieve a first operand and a second operand from the system memory in response to executing one or more instructions associated with processing a database, wherein the database includes at least one fixed-length number and at least one variable-length number, and wherein each of the first operand and the second operand include a sign and exponent block, and one or more mantissa digits;

receive an operation associated with the first operand and the second operand;

convert mantissa digits included the first operand from an initial format to a first format;

convert mantissa digits included in the second operand from the initial format to the first format;

in response to a determination that the operation is a multiplication or division operation:
  convert the first format of the first operand to a second format;
  convert the first format of the second operand to the second format;
  perform the operation on the first operand and the second operand to generate a first result, wherein the first result includes a first sign and exponent block, a first length block, and a first one or more mantissa digits; and otherwise perform the operation using the first operand and the second operand to generate a second result, wherein the second result includes a second sign and exponent block, a second length block, and a second one or more mantissa digits.

16. The system of claim 15, wherein each processor of the plurality of processors is further configured to clear unused mantissa digits included in the second result.

17. The system of claim 16, wherein to clear the unused mantissa digits, each processor of the plurality of processors is further configured to convert a format of each unused mantissa digit to the initial format of the first operand and the second operand.

18. The system of claim 15, wherein the first format includes binary coded centimal, and the second format includes binary coded decimal.

19. The system of claim 15, wherein in response to the determination that the operation is a multiplication or division operation, each processor of the plurality of processors is further configured to convert a format of each mantissa digit included in the first result in response to a determination the operation has completed.

20. The system of claim 19, wherein each processor of the plurality of processors is further configured to perform a carry-propagate operation in response to a determination the operation is a multiplication operation.

* * * * *

UNITED STATES PATENT AND TRADEMARK OFFICE
CERTIFICATE OF CORRECTION

PATENT NO. : 10,180,819 B2
APPLICATION NO. : 15/334349
DATED : January 15, 2019
INVENTOR(S) : Brooks et al.

Page 1 of 1

It is certified that error appears in the above-identified patent and that said Letters Patent is hereby corrected as shown below:

In the Specification

In Column 7, Line 13, delete "(PCI Express)," and insert -- (PCI Express™), --, therefor.

In Column 7, Line 19, delete "PCI Express." and insert -- PCI Express™. --, therefor.

Signed and Sealed this
Seventh Day of January, 2020

Andrei Iancu
*Director of the United States Patent and Trademark Office*